United States Patent Office 3,686,047
Patented Aug. 22, 1972

3,686,047
PROCESS FOR CONTINUOUSLY PRODUCING AT HIGH SPEEDS A FOAM POLYURETHANE RESIN LAMINATE
Gordon R. Miller, Lake Jackson, Tex., assignor to The Dow Chemical Company, Midland, Mich.
Filed Dec. 21, 1970, Ser. No. 99,759
Int. Cl. B32b 5/20, 31/12
U.S. Cl. 156—79   18 Claims

ABSTRACT OF THE DISCLOSURE

Thermoset foams and foam laminates are prepared by applying a coating of a first reactant onto a plurality of substrates, passing the substrates through a pair of nip rolls, applying the second reactant at the interface of the plurality of substrates and adjusting the pressure between the pair of nip rolls such that a fillet of the first and second reactants is formed at the interface of the pair of substrates, passing the substrates containing the expanding mixture of reactants through a sizing device wherein expansion between the substrates is completed thereby producing a thermoset foam laminate.

---

This invention concerns a process for preparing thermoset foams and foam laminates and more particularly concerns a process for preparing relatively thin polyurethane foam laminates at rapid linear speeds.

Thermoset foam laminates have heretofore been prepared by placing a mixture of the reactants onto one substrate and thereafter placing a second substrate onto the mixture of reactants.

Other methods have involved gluing or otherwise attaching two substrates onto prefoamed cores to produce a foamed laminate.

These methods involved several separate operations and do not lend themselves to high speed preparation of thermoset foam laminates.

Urethane coatings have previously been applied to a single substrate by applying a coating of a polyester containing hydroxy groups, catalyst and water to the substrate and thereafter spraying a polyisocyanate in uncontrolled quantities onto the composition. Such a process is taught in U.S. 2,866,722.

The above described process differs from the present invention in that the present invention makes it possible to prepare, at high speeds, thermoset foams and sandwich structures having a foam core i.e. a plurality of substrates with foam therebetween wherein said structures possess a uniform thickness of controlled dimensions.

Several U.S. patents, e.g. U.S. 3,047,449, U.S. 3,240,-655, and U.S. 3,240,845, have employed processes whereby a mixture of reactants is applied to one or more substrates by means of traversing mixing heads. The present invention does not apply mixtures of reactants to any of the substrates.

The process of the present invention lends itself readily to high speed production of thermoset foam laminates, particularly to laminates of polyurethane foam between paper substrates.

It has now been discovered that thermoset polymer foam laminates can be prepared at high speeds, e.g. up to about 2000 feet per minute or more, by a process which comprises applying a coating of a first reactant to a pair of substrates, passing said coated substrates between a pair of rolls, said substrates and rolls being arranged such that the coating surfaces contact each other to form an interface, applying a second reactant at said interface thereby producing a foaming mass between said pair of substrates which rapidly produces a thermoset polymer foam laminate after passing from said rolls.

It has also been discovered that thermoset foam laminates can be prepared at high speeds, e.g. up to about 2000 linear feet per minute and above, by a process which comprises applying a coating of a first reactant to a first substrate, applying a coating of a second reactant to a second substrate, passing said coated substrates between a pair of rollers, said substrates being arranged on said rollers such that the reactant surfaces contact each other to form an interface therebetween, thereby producing a foaming mass between said substrates which rapidly produces a thermoset polymer foam laminate after passing from said rolls.

It has also been discovered that thermoset polymer foam sheets can be prepared at high speeds, e.g. up to about 2000 linear feet per minute or more by a process which comprises applying a coating of a first reactant to a first endless substrate, applying a coating of a second reactant to a second endless substrate, passing said coated substrates between a pair of rollers, said substrates being arranged on said rollers such that the coating surfaces contact each other to form an interface therebetween thereby producing a foaming mass between said substrates, removing said substrates from constact with the foam thereby producing a thermoset foam sheet.

It has further been discovered that thermoset polymer foam sheets and laminates can be prepared at high speeds e.g. up to about 2000 feet per minute or more by applying a first reactant to each of a plurality of substrates, passing said substrates between a pair of nip rolls with the coated surfaces of the said substrates in facing relation to each other, applying a second reactant at the interface formed by the coated surfaces of said substrates, adjusting the pressure between the nip rolls such that a fillet of reactants comprising the said first and second reactants is formed between the substrates at the interface and thereafter passing the plurality of substrates containing the expanding mixture of reactants from said nip rolls through a sizing device thereby producing a thermoset foam laminate.

It is an object of the present invention to prepare thermoset foam laminates of relatively thin cross-section.

It is another object of the present invention to prepare thermoset foam laminates at high linear speeds.

A further object of the present invention is to prepare thermoset foam sheets.

A still further object of the present invention is to provide a process to prepare thermoset foam sheets and laminates without an external mixer for the reactants employed to produce said foam sheets or laminates.

These and object objects will become readily apparent from the following detailed description and discussion of the accompanying drawings wherein preferred embodiments of the invention are discussed.

Figure 1:
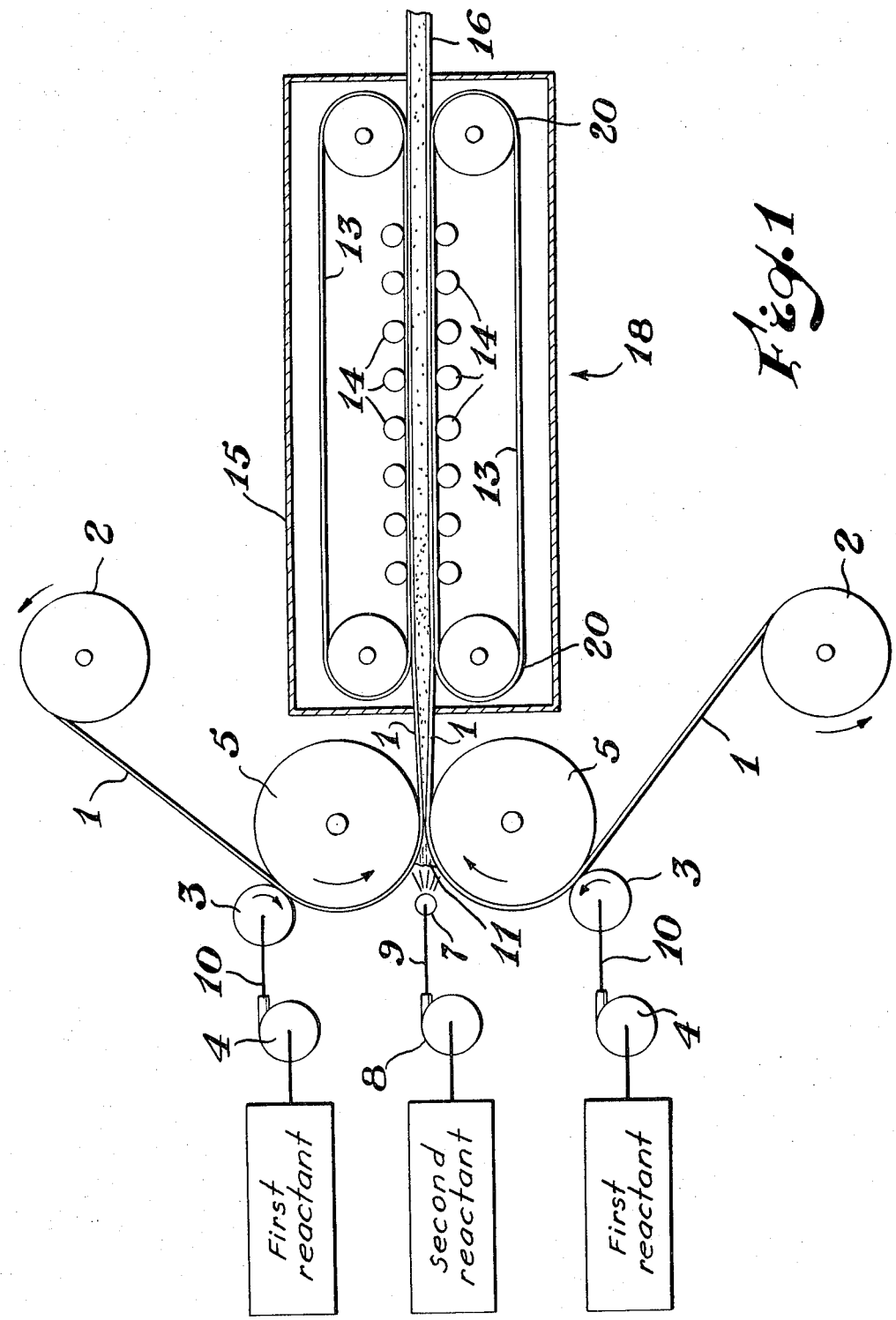
FIG. 1 is a side elevation showing one preferred method and device of practicing the present invention.

The thermoset compositions which are useful as foamed core material in the present invention include polyurethanes, epoxy resins, polyesters, vinyl esters, phenolics and the like.

The compositions employed to prepare polyurethane foams are well known in the art and may be either rigid, flexible or semi-rigid. Such compositions include, for example, a polyhydroxyl-containing compound such as, the propylene oxide adduct of glycerine and the like; a polyisocyanate such as, toluene diisocyanate, polymethylene polyphenylisocyanate, isocyanate containing prepolymers and the like, a foaming or blowing agent such as water, a low-boiling halogenated hydrocarbon such as, for example, trichloromononfluoromethane, a low boiling hydrocarbon such as, for example, pentane, and the like; a catalyst or mixtures of catalysts such as, for example, tertiary amines such as, for example, triethylenediamine, dimethylethanolamine, and the like, metal salts such as, for example, dibutyltin diacetate, dibutyltin dilaurate, and the like, and alkali metal hydroxides, such as, for example, sodium hydroxide, potassium hydroxide, and the like, and other optional ingredients such as inert fillers or colorants such as, clay or coloring agents and the like, fire retardant agents such as, for example, tris (chloroethyl)phosphate and the like.

The compositions employed in the preparation of epoxy resins are likewise well known, and in addition to the reactants i.e. a polyepoxide such as, for example, a diglycidyl ether of a bisphenol, and curing agent therefor such as, for example, diethylene triamine, aminoethyl piperazine, aminoethylethanolamine and the like, the foam formulation includes a blowing or foaming agent such as, for example, trichloromonofluormethane, and other optional compounds such as pigments or coloring agents, reactive diluents such as, for example, butyl glycidyl ether, fillers, extenders, accelerators, such as, for example, phenol, and the like.

The substrates employed herein may be either natural or synthetic and include paper, textile fabrics, carpet, polymer films prepared from ethylenically unsaturated monomers such as, for example, polyethylene, polypropylene or their copolymers with other vinyl monomers, metal foils and the like. The substrates employed to prepare the sandwich structures by the process of the present invention may be the same or different.

In practicing the present invention, the foamable composition employed should have a high order of reactivity, i.e. the composition should have low foam times e.g. less than about 20.0 seconds and preferably less than about 5.0 seconds from the time of contact of the first and second reactants until the foam has expanded to its fullest extent.

The components making up the foamable composition, other than the first and second reactants, such as the blowing agent, catalyst, fire retardant agent and the like can be mixed and applied to the substrates or interface with either of the reactants; however, in the preparation of polyurethane foams or laminates, it is preferable that they be mixed with the polyol reactant i.e. the component having a plurality of hydroxyl or active hydrogen groups.

The foams and laminates produced by the present invention will generally have thicknesses in the range of from about 1/32" up to about 2" and preferably from about 1/8" to about 1/2". The foams and laminates or foamed sandwich structures may be prepared by the present invention at linear speeds of up to about 600 feet per minute and above and preferably up to about 2000 feet per minute and above.

In a preferred embodiment of the invention as shown in FIG. 1, a pair of substrates 1, progress from a pair of substrate supply rolls 2 to intimate contact with a pair of coating rolls 3 supplied with a first reactant from pumps 4 through lines 10 where the substrates 1 are coated with a first reactant. The pair of substrates 1, coated with the first reactant, are directed between a pair of nip rolls 5 provided with a means for adjusting the pressure therebetween (not shown). A second reactant is sprayed onto the interface formed by the pair of substrates 1 through a spray device 7 supplied by pump 8 through line 9, the pressure between the pair of nip rolls 5 being adjusted so that a fillet of reactant materials 11 is formed at the interface of the pair of substrates 1. The ratio between the first and second reactants is such that an approximate stoichiometric chemical equivalent is achieved e.g. for polyurethane compositions, the ratio between the first and second reactants is such that an NCO:OH ratio of from about 0.85:1 to about 1.2:1 is achieved. This ratio is maintained by adjusting the flow through the reactant feed pumps 4 and 8. The pair of substrates 1, containing an expanding mixture of said first and second reactants therebetween, emerge from the pair of nip rolls 5 and are conducted through a sizing device comprising a pair of endless belts 13 supported by a plurality of rollers 14 and 20 wherein the product of the first and second reactants rises between the pair of substrates 1 forming a foam core 12 to produce a thermoset foam laminate 16 of desired thickness.

The distance between the pair of endless belts 13 can be varied depending upon the thickness of the laminate that is desired to be produced. The sizing device generally shown at 18 may be enclosed by a chamber 15 which may be heated or may operate at room temperature. The pair of nip rolls 5 may be heated or operated at room temperature. In some instances, it may be desired to apply heat to the pair of nip rolls 5 in order to increase the speed with which the first and second reactants react.

Figure 2:
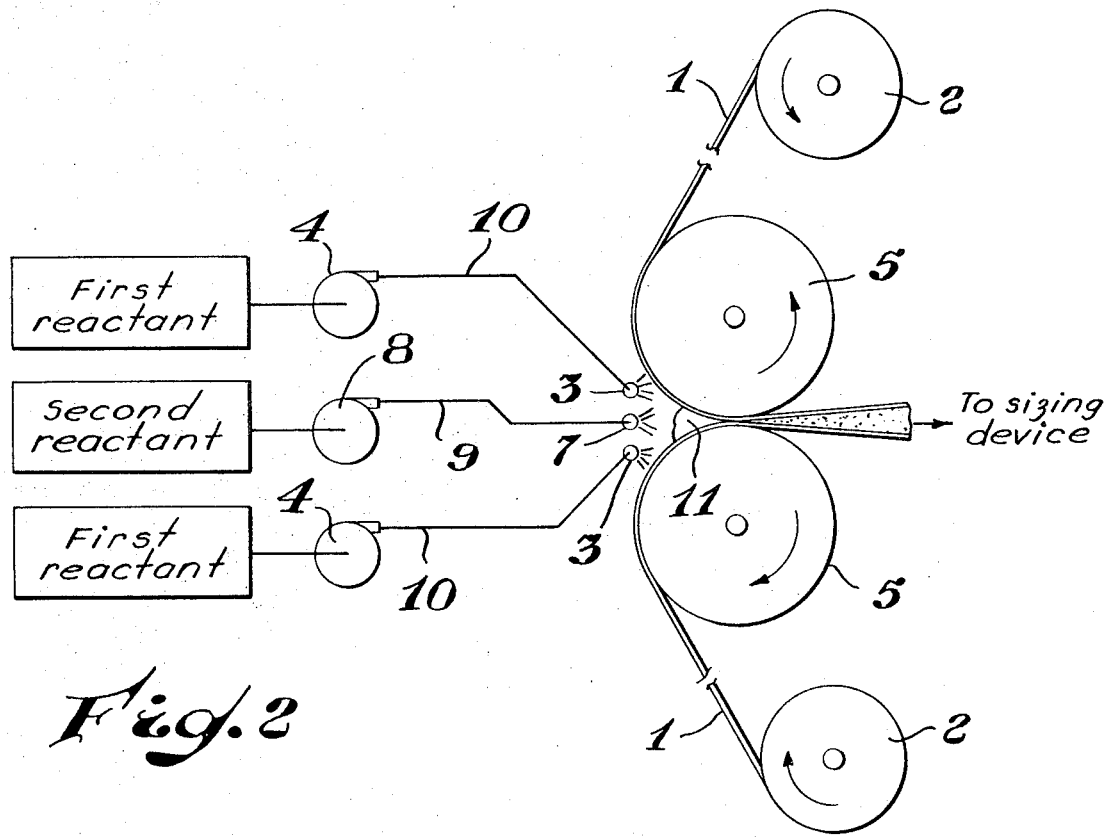
FIG. 2 is a side elevation showing an additional preferred method and device for practicing the present invention.

In FIG. 2, a side elevation is shown illustrating an arrangement wherein the first reactant is applied to a pair of substrates 1 by means of a spray apparatus 3 supplied through line 10 by means of a pump 4. The second reactant or mixture containing the second reactant is applied to the interface of the pair of nip rolls 5 by means of a spray device 7 supplied through line 9 from pump 8. The pair of spray devices 3 are arranged such that the entire width of the pair of substrates 1 is coated with the said first reactant. The spray device 7 is constructed in such a manner that the entire width of the nip formed by the nip rolls 5 is coated by the second reactant from said spray device 7. The pressure between the pair of nip rolls 5 is adjusted such that a fillet 11 of liquid reactants is formed.

Thin foam sandwich compositions may also be prepared according to the present invention by applying a first reactant to one of the substrates and applying the second reactant to the other substrate, thereby eliminating the requirement for the spray device 7, as shown in FIGS. 1 and 2.

Figure 3:
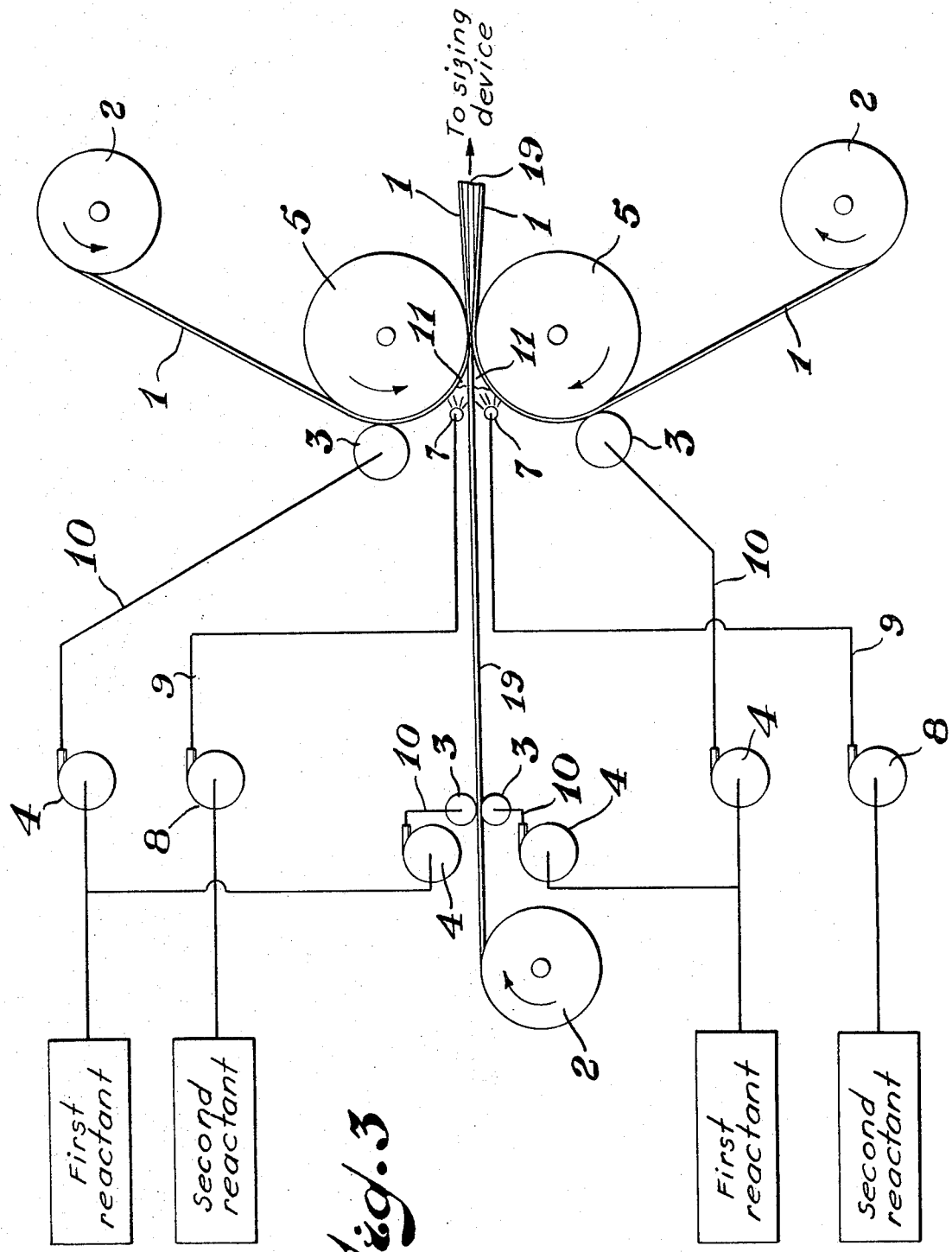
FIG. 3 is a side elevation showing a method and device for practicing the present invention employing 3 substrates.

In FIG. 3, a side elevation is shown illustrating an arrangement wherein the inner surfaces of a plurality of substrates 1 and 19 are coated with a first reactant by means of coating rolls 3. These coating rolls 3 are supplied with said first reactant by means of pumps 4 through lines 10. The plurality of substrates are passed between a pair adjustably positioned nip rolls 5. A second reactant is applied at the interfaces formed by the substrates 1 as they pass through the nip rolls 5 by means of a spray device 7 supplied by means of pumps 8 through lines 9. The pressure between the pair of nip rolls 5 is adjusted so that fillets 11, of said first and second reactants are formed at the said interfaces created by the substrates 1 and 19. The substrates 1 and 19 exit from the pair of nip rolls 5 with an expanding reaction mixture of said first reactant and second reactant therebetween and subsequently into a sizing device 18 illustrated in FIG. 1.

Thin foam laminates may also be prepared according to the present invention by applying either a first or second reactant to a pair of outer substrates 1 and applying the other reactant to the inner substrate 19, thereby eliminating the requirement for the spray device 7 in FIG. 3 and providing a stiffening or reinforcing element for the foam sandwich. This is also a good method for the rapid production of somewhat thicker laminates.

In practicing the present invention, any number of substrates may be employed, depending on the characteristics desired in the finished laminate or sandwich structure, so long as there are at least one pair of facing surfaces e.g. when two substrates are employed, there is one pair of facing surfaces, when three substrates are employed, there are two pair of facing surfaces and when four substrates are employed, there are three pair of facing surfaces. Foam core sandwich panels my be prepared by any of the following methods:

(A) Each face of each pair of facing surfaces is coated with either of the first or second reactants and the other reactant sprayed between the interface formed by the facing surfaces as they pass between the pair of nip rolls, or alternatively, (B) One face of each pair of facing surfaces is coated with either of the first or second reactant and the other surface coated with the other such reactant.

In the foregoing descriptions, the term inner surface of the substrates means any surface of any substrate not in direct contact with either of said nip rolls.

Means which may be employed to apply the first reactant to the inner surfaces of the substrates other than roller and spray means include, for example, self- or pressure-feeding brushes, doctor or wiping blades or bars and the like.

In a preferred method wherein the foam core is a polyurethane, all the ingredients making up the urethane foam formulation except the isocyanate are mixed together and the mixture applied at the interface of the pair of substrates 1 and the isocyanate applied to each of the pair of said substrates.

The apparatus and method of the present invention is likewise useful in the manufacture of thermoset foam sheets having no substrate adhered thereto. In order to produce such thermoset foam sheets, the outer substrates are removed from the laminate prepared according to this invention as the laminate exits from the sizing device. This is accomplished by either peeling off the outer substrates as the laminate exits from the sizing device or by employing a pair of endless substrates by combining the nip rolls with the sizing device whereby the outer substrates are automatically removed as the thermoset foam exits from the sizing device. This latter and preferred method is illustrated in FIG. 4 and by the following description.

Figure 4:
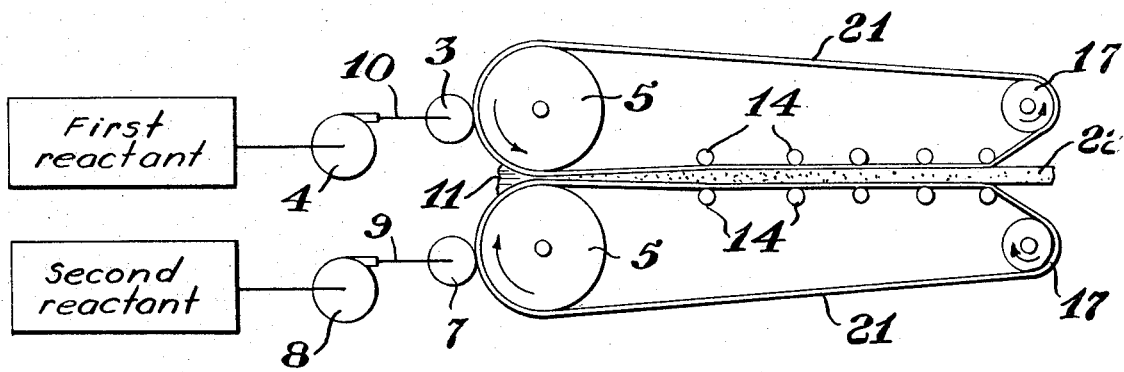
FIG. 4 is a side elevation showing the preparation of thermoset foam sheets or slabs according to the present invention.

In FIG. 4, an apparatus is illustrated for the manufacture of thermoset polymer foam wherein a pair of endless substrates 21 each circumscribe, at one extremity, one of a pair of adjustable nip rolls 5 and at the other extremity one of a pair of adjustable tensioning rollers 17. Each of said endless substrates 21 are provided with a plurality of internally positioned, adjustable, spaced-apart sizing rollers 14. The apparatus provides a means 3 for applying a first reactant to one of said pair of endless substrates 1 as said substrate travels over one of said pair of nip rolls 5, and a means 7 for applying a second reactant to the other of said pair of endless substrates 1 as it travels over the other of said pair of nip rolls 5.

In operation, the upper endless substrate 1 travels about its respective nip roll 5 while a first reactant is applied thereto by means of a coating device 3 supplied through line 10 by means of pump 4. The lower endless substrate 1 in a like manner is coated with a second reactant by means of a coating device 7 supplied through line 9 by means of pump 8. The reactant coated pair of endless substrates travel between said pair of nip rolls 5, wherein the pressure therebetween is adjusted so as to produce a fillet of liquid reactant materials 11 therebetween. Said substrates exit from the nip rolls with a reacting and foaming mass therebetween and pass between a plurality of adjustable sizing rollers 14, thereby producing a thermoset polymer foam 22 between the substrates 1. The pair of endless substrates 1 are removed from contact with the thermoset polymer foam 22 by travel over the last of said sizing rollers 14, and over said tensioning rollers 17 to thereby produce a thermoset polymer foam sheet, slab or plank.

In an alternative method for practicing the present invention either the first or the second reactant is applied to both of the pair of endless substrates 1, and the other reactant is applied at the interface formed when said substrates pass between the pair of nip rolls. The above methods are particularly adaptable for the production of rigid polyurethane foam sheets.

Another alternate method for the preparation of thermoset foam sheets, slabs or planks is to provide an apparatus such as illustrated in FIG. 1 with a pair of take up reels positioned in a manner such that the upper and lower substrates are removed from contact with the thermoset foam laminate as it exits from the sizing device.

Thermoset foam sheets and laminates may also be prepared according to the present invention by directing a stream or spray or the like of both the first and second reactants at each interface of the facing pair of surfaces formed by the plurality of substrates as they pass between the pair of nip rolls, said surfaces not having been previously coated with either the first or second reactants.

In each of the preceding FIGS. 1, 2, 3 and 4 the quantities of reactants employed is controlled by means of metering devices, gear pumps and the like, not illustrated in the figures.

A suitable urethane formulation which may be employed to produce a thermoset foam or thermoset foam laminate by the process of the present invention is as follows:

First reactant composition: Parts by wt.
Polymethylene polyphenylisocyanate having a functionality of about 2.6 and an NCO equivalent weight of about 135 _____ 100

Second reactant composition:
A tetrafunctional polyol comprising the reaction product of aminoethylethanol amine with 3 moles of propylene oxide per mole of aminoethyl ethanol amine having an OH equivalent of about 70 _____ 50
Silicone oil (cell control agent) _____ 1.4
Dimethylethanolamine (catalyst) _____ 1.4
Dibutyltin dilaurate (catalyst) _____ 0.14
Trichlorofluoromethane (blowing agent) ____ 25.7

Another suitable urethane formulation which may be employed to produce a thermoset foam or thermoset foam laminate by the process of the present invention is as follows:

First reactant composition: Parts by wt.
Polymethylene polyphenylisocyanate having a functionality of about 2.6 and an NCO equivalent weight of about 135 _____ 138

Second reactant composition:
Reaction product of aminoethylethanolamine oxide having a hydroxyl number of about 375 _____ 51
Reaction product of aminoethylethanolamine with propylene oxide having a hydroxyl number of about 800 _____ 49
Potassium hydroxide (catalyst) _____ 0.5
Silicone oil (cell control agent) _____ 0.75
Trichloromonofluoromethane (blowing agent) _____ 38

I claim:
1. A high speed process for preparing a polyurethane foam laminate from a first composition comprising a polyol having a plurality of active hydrogen groups, a catalyst for urethane formation, a cell control agent, and a blowing agent; and a second composition comprising a polyisocyanate, the mixture of which produces a polyurethane foam, which comprises:
applying one of said first and second compositions to a pair of substrate surfaces,
passing said coated substrate surfaces between a pair of rollers, said substrate surfaces and rollers being arranged such that the coated substrate surfaces contact each other to form an interface, and applying the other composition at said interface thereby producing a foaming mass between said pair of substrate surfaces after they pass between said rollers to thereby produce a thermoset polymer foam laminate; and wherein the mixture has a foam time of less than about 20 seconds and the thickness of the resultant laminate is from about 1/32″ to about 2″.

2. The process of claim 1 wherein said second composition is applied to the substrate surfaces.

3. A high speed process for preparing a polyurethane foam laminate from a first composition comprising a polyol having a plurality of active hydrogen atoms and a second composition comprising an organic polyisocyanate, the mixture of which produces a polyurethane foam, which comprises:

applying one of said first and second compositions to a first substrate surface, applying the other composition to a second substrate surface, and passing the thus coated substrate surfaces between a pair of rollers such that the said coated surfaces contact each other to form an interface therebetween, thereby producing a foaming mass between said substrate surfaces as they exit from said rollers to thereby produce a polyurethane foam laminate; wherein at least one of the first and second reactant-containing compositions contains a foaming agent and at least one of the said compositions contains a catalyst for urethane formation; and wherein the mixture has a foam time of less than about 20 seconds and the thickness of the resultant laminate is from about 1/32″ to about 2″.

4. A high speed process for preparing a polyurethane foam sheet from a first composition comprising a polyol having a plurality of active hydrogen atoms, a cell control agent, a catalyst for urethane formation and a blowing agent and a second composition comprising an organic polyisocyanate, the mixture of which produces a polyurethane foam, which comprises, applying one of said first and second compositions to a first endles substrate surface, applying the other composition to a second endless substrate surface, passing the thus coated substrate surfaces between a pair of rollers such that the thus coated surfaces contact each other to form an interface therebetween thereby producing a foaming mass between said surfaces as they exit from said rollers, and removing said substrate surfaces from contact with the resultant foam thereby producing a polyurethane foam sheet; and wherein the mixture has a foam time of less than about 20 seconds and the thickness of the resultant sheet is from about 1/32″ to about 2″.

5. A process for preparing polyurethane foam laminates from a first composition comprising a polyol having a plurality of active hydrogen atoms, a cell control agent, a catalyst for urethane formation, and a blowing agent; and a second composition comprising an organic polyisocyanate, the mixture of which produces a polyurethane foam, which comprises:

applying one of said first and second compositions to a plurality of substrate surfaces, passing the thus coated substrate surfaces between a pair of nip rollers such that the coated surfaces contact each other to form an interface, applying the other composition at the interface formed by the substrate surfaces, adjusting the pressure between the pair of nip rollers such that a fillet of said first and second compositions is formed between the substrate surfaces at the interface thereof, and passing the substrate surfaces containing the foam forming composition through the nip rollers and subsequently through a sizing device thereby producing a polyurethane foam laminate; and wherein the mixture has a foam time of less than about 20 seconds and the thickness of the resultant laminate is from about 1/32″ to about 2″.

6. The process of claim 5 wherein said second composition is applied to the plurality of substrate surfaces.

7. The process of claim 1 wherein the thickness of the laminate is from about 1/8″ to about 1/2″.

8. The process of claim 7 wherein the foam time of the mixture is less than about 5 seconds.

9. The process of claim 2 wherein the thickness of the laminate is from about 1/8″ to about 1/2″.

10. The process of claim 9 wherein the foam time of the mixture is less than about 5 seconds.

11. The process of claim 3 wherein the thickness of the laminate is from about 1/8″ to about 1/2″.

12. The process of claim 11 wherein the foam time of the mixture is less than about 5 seconds.

13. The process of claim 4 wherein the thickness of the foam sheet is from about 1/8″ to about 1/2″.

14. The process of claim 13 wherein the foam time of the mixture is less than about 5 seconds.

15. The process of claim 2 wherein the laminate has a thickness of from about 1/8″ to about 1/2″.

16. The process of claim 15 wherein the foam time of the mixture is less than about 5 seconds.

17. The process of claim 6 wherein the laminate has a thickness of from about 1/8″ to about 1/2″.

18. The process of claim 17 wherein the foam time of the mixture is less than about 5 seconds.

References Cited

UNITED STATES PATENTS

| | | | |
|---|---|---|---|
| 2,753,276 | 7/1956 | Brochhagen et al. | 156—310 UX |
| 3,037,900 | 6/1962 | Hings et al. | 156—310 |
| 3,049,463 | 8/1962 | Kallander et al. | 156—78 X |
| 3,340,335 | 9/1967 | Winchcombe | 264—45 |
| 3,598,671 | 8/1971 | Wortman | 156—73 |

FOREIGN PATENTS

| | | | |
|---|---|---|---|
| 722,628 | 11/1965 | Canada | 156—79 |
| 265,749 | 7/1963 | Australia | 156—310 |
| 361,052 | 7/1938 | Italy | 156—310 |
| 737,885 | 7/1966 | Canada | 156—79 |
| 989,594 | 4/1965 | Great Britain | 156—79 |
| 1,347,199 | 11/1963 | France | 156—79 |

PHILIP E. ANDERSON, Primary Examiner

U.S. Cl. X.R.

156—242, 330, 331; 161—161, 165, 184, 190; 260—2.5 AB, 2.5 AQ, 2.5 AS, 2.5 BC, 2.5 BD; 264—47, 53, 54, DIG. 17

PO-1050
(5/69)

UNITED STATES PATENT OFFICE
CERTIFICATE OF CORRECTION

Patent No. 3,686,047                 Dated      Aug. 22, 1972

Inventor(s) Gordon R. Miller

It is certified that error appears in the above-identified patent and that said Letters Patent are hereby corrected as shown below:

Column 2, line 24, delete "constact" and insert therefor --contact--.

Column 2, line 51, delete "object" and insert therefor --other--.

Column 5, line 5, delete "my" and insert therefor --may--.

Signed and sealed this 8th day of May 1973.

(SEAL)
Attest:

EDWARD M. FLETCHER, JR.             ROBERT GOTTSCHALK
Attesting Officer                    Commissioner of Patents